(12) United States Patent
Omtveit et al.

(10) Patent No.: US 6,444,193 B1
(45) Date of Patent: Sep. 3, 2002

(54) PROCESS FOR PREPARATION OF GAS CONTAINING VESICLES

(75) Inventors: Tore Omtveit; Bjorn Haugseter; Tony Pete, all of Oslo (NO)

(73) Assignee: Nycomed Imaging AS, Oslo (NO)

( * ) Notice: Subject to any disclaimer, the term of this patent is extended or adjusted under 35 U.S.C. 154(b) by 0 days.

(21) Appl. No.: 09/503,082

(22) Filed: Feb. 14, 2000

Related U.S. Application Data

(63) Continuation of application No. PCT/GB98/02470, filed on Aug. 18, 1998.
(60) Provisional application No. 60/064,312, filed on Nov. 5, 1997.

(30) Foreign Application Priority Data

Aug. 18, 1997 (GB) .............................................. 9717476

(51) Int. Cl.[7] .......................... A61K 49/00; B01F 17/00
(52) U.S. Cl. .......................... 424/9.52; 516/11; 516/77
(58) Field of Search ............................... 424/9.52, 9.51, 424/450, 489; 516/11, 77; 428/402; 264/4.1, 8; 427/212; 366/303

(56) References Cited

U.S. PATENT DOCUMENTS

| 4,661,366 A | | 4/1987 | Pinto et al. | |
|---|---|---|---|---|
| 5,552,133 A | * | 9/1996 | Lambert et al. | 424/9.52 |
| 5,643,506 A | * | 7/1997 | Rourke | 264/4.1 |
| 5,855,865 A | * | 1/1999 | Lambert et al. | 424/9.52 |
| 5,959,001 A | * | 9/1999 | Walz et al. | 523/161 |
| 5,980,460 A | * | 11/1999 | Ostensen et al. | 600/454 |
| 6,221,337 B1 | * | 4/2001 | Dugstad et al. | 424/9.52 |

FOREIGN PATENT DOCUMENTS

| WO | WO 86 02630 A | 5/1986 |
|---|---|---|
| WO | EP 0 324 938 A | 7/1989 |
| WO | WO 96 22830 A | 8/1996 |

OTHER PUBLICATIONS

"A New Generation of Supraton Machines" Technische Mitteilungen Krupp, Jun. 1988, XP002028313.

* cited by examiner

*Primary Examiner*—Michael G. Hartley
(74) *Attorney, Agent, or Firm*—Royal N. Ronning, Jr.; Robert F. Chisholm; Stephen G. Ryan

(57) ABSTRACT

The invention provides a process for the preparation of gas-containing vesicles wherein a mixture of gas, liquid and vesicle membrane forming material is passed through a zone in which it is subject to shear forces exerted by surfaces moving relative to each other at a speed of at least 20 m/s.

9 Claims, 2 Drawing Sheets

PROCESS FOR PREPARATION OF GAS CONTAINING VESICLES

This application is a continuation of pending international application number PCT/GB98/02470 filed Aug. 18, 1998 (of which the entire disclosure of the pending, prior application is hereby incorporated by reference), which itself is a continuation-in-part of U.S. provisional application number 60/064,312 filed Nov. 5, 1997.

The present invention relates to a process for the preparation of gas-containing vesicles, e.g. ultrasound contrast agents or precursors therefore.

For ultrasound diagnostic imaging it has been widely proposed to use a contrast agent comprising vesicles (e.g. microballoons, liposomes or micelles) which comprise a gas or gas mixture entrapped within a membrane. For this purpose, the membrane may be a mono-layer or a multilayer, e.g. of an amphiphilic material such as a lipid.

Such gas-containing vesicles may readily be produced by shaking or sonicating a liquid containing a membrane-forming material in the presence of a suitable gas or gas mixture. (By gas or gas mixture is included a material which is gaseous at body temperatures, e.g. at 37° C.).

However, the vesicles produced by such techniques have a broad size distribution which may vary from batch to batch and moreover the yield, ie. the percentage of membrane forming material which ends up in appropriately sized gas-containing vesicles, may also vary from batch to batch.

Desirably the vesicles produced will have a narrow size distribution about the desired vesicle size, generally 1 to 7 μm, e.g. 3±1 μm.

We have now found that yield can be improved and undue production of oversized vesicles avoided if vesicle production is effected using a rotor-stator mixer, ie. a mixer in which the starting mixture is passed through a zone in which shear forces are exerted upon it by relative rotation of two surfaces, one on an element referred to as a rotor and the other on an element referred to as a stator.

Rotor-stator mixers are commonly used to produce emulsions from a mixture of immiscible liquids and a schematic drawing of a standard laboratory scale rotor-stator is shown in FIG. 1 of the accompanying drawings. Such a rotor-stator, with a rotor external diameter of 15 mm was used at a rotation rate of 23000 rpm to produce the gas-containing vesicles described in Example 2(b) of WO97/29783 (Nycomed).

However we have now found that the yield of appropriately sized gas-containing vesicles is improved if the relative speed of the rotor and stator surfaces is at least 20 m/s.

Thus viewed from one aspect the invention provides a process for the preparation of gas-containing vesicles wherein a mixture of gas or gas-precursor, liquid and vesicle membrane forming material is passed through a zone in which it is subject to shear forces exerted by surfaces moving relative to each other at a speed of at least 20 m/s, preferably at least 25 m/s, especially preferably at least 30 m/s, and more especially preferably at least 35 m/s, e.g. up to 100 m/s, more particularly up to 60 m/s, and especially up to 50 m/s.

We have also found that the vesicle size distribution is improved if the vesicle forming mixture is passed successively through a plurality of shear force zones (e.g. rotor:stator stages), e.g. at least two such zones, preferably at least three and more preferably at least four such zones, especially preferably at least 12 such zones e.g. up to 90, more particularly up to 44 such zones, e.g. up to 20 or up to 12 such zones. In this way the range of residence times within the shear force zone(s) will have a narrower distribution and the occurrence of over-sized vesicles is reduced. Indeed having a plurality of sequential shear force zones through which the mixture passes avoids the need to recirculate the mixture through an open shear force zone and so ensures that adequate mixing occurs with the entirety of the mixture experiencing substantially the same mixing conditions, e.g. residence time and temperature profile. Such uniform and definable mixing parameters result in a product with significantly lower batch to batch variation in properties and is of great importance in a mixing process upscaled from the laboratory bench to pilot plant or commercial manufacture.

Thus viewed from a further aspect the invention also provides a process for the preparation of gas-containing vesicles wherein a mixture of gas or gas-precursor, liquid and vesicle membrane forming material is passed sequentially through a plurality of different zones in which it is subject to shear forces exerted by surfaces moving relative to each other. In this second process, the mixture is advantageously passed through at least one such zone in which the relative speed of the surfaces is at least 10 m/s, preferably at least 15 m/s, especially at least 30 m/s, more especially up to 50 m/s and especially preferably is in accordance with the first process of the invention. Using a 110 mm diameter outer zone, it has been found advantageous to operate at a relative surface speed of 46 m/s.

In the processes of the invention, the surfaces moving relatively to each other to create the shear force zones are desirably separated from each other by less than 2 mm, preferably less than 1 mm, especially preferably less than 500 μm, e.g. 100 to 300 μm. The optimum separation will depend upon the viscosity of the mixture passing through the shear force zones and the minimum separation may be imposed by manufacturing constraints. Generally however for an aqueous-mixture the separation will desirably be in the range 200 to 300 μm. As some deformation may occur while the surfaces are moving, such separations refer to values measurable when the surfaces are not moving.

For convenience sake, the shear force zones will generally be created-between a moving surface and a static surface, preferably a rotating surface and a static surface, ie. as in a rotor-stator mixer.

Where the mixture passes through a plurality of shear force zones, this may for example be provided by a plurality of rotor-stator devices, with successive such devices receiving the mixture produced by the previous device. Such devices may have separate rotation drives or may share a common drive, ie. be arranged coaxially about a common drive shaft. However, it is more efficient to use one or more rotor-stator combinations each of which provides a plurality of radially separated shear force zones.

Thus viewed from a further aspect the invention provides a process for the preparation of gas-containing vesicles wherein a mixture of gas or gas-precursor, liquid and vesicle membrane forming material is passed sequentially through a plurality of different zones in which it is subject to shear forces exerted by at least one rotor moving relative to at least one stator, preferably exerted by two or more (e.g. 2 to 20, for example 2 to 10) coaxial rotors each preferably providing two or more (e.g. 2 to 20, for example 2 to 10 but conveniently higher, e.g. 13) radially separated said zones.

The relative speeds of the rotor and stator surfaces in the third process of the invention will preferably be such that in at least one zone the rotor and stator surfaces move at a relative speed of at least 10 m/s, preferably at least 15 m/s more preferably at least 30 m/s, e.g. up to 50 m/s, and especially preferably in accordance with the first process of the invention.

Rotor-stator mixer apparatus suitable for use in this third process of the invention is novel and forms a further aspect of the invention.

Viewed from this aspect the invention provides a rotor-stator mixer apparatus comprising a mixing chamber having gas and liquid inlet ports and a mixture outlet port, with disposed in said chamber a rotor and drive means therefore, said mixer having in facing relationship to said rotor a stator, said stator and rotor having axially extending interlocking ridges and grooves provided with radially extending fluid transit means whereby to define a plurality of shear force zones for fluid passing radially between said rotor and said stator from said inlet ports.

In the mixer apparatus of the invention, the inlet ports are preferably located radially inwardly of the shear force zones, preferably at or near the rotation, axis of the rotor. Desirably the inlet ports are adjacent a mixing means, e.g. an axially extending flange or "propeller", provided on a drive shaft for the rotor, so that the gas and liquid are mixed before entering the shear force zones.

To ensure that adequate mixing occurs, it is preferred that a second rotor (and if desired further rotors, for example up to 5 rotors) is provided, driven by the same drive means, preferably a rotating drive shaft. Where a second rotor is provided, the mixer will desirably have a second mixing chamber having an inlet port communicating with the outlet port of the first chamber and having its own outlet port. Again desirably the inlet port of the second chamber will be radially inwards of the shear force zones between the second rotor and its stator.

The stators may be within the mixing chambers or a stator may be provided by a wall of a mixing chamber.

The rotor:stator combinations provide a plurality of radially separated shear force zones, for example 2 to 25, preferably 7 to 20, particularly 9 to 15, per combination. Thus an apparatus having two rotor:stator combinations may desirably provide a total of 18 to 30 shear force zones.

In the rotor:stator combinations, the interlocking ridges and grooves are preferably provided by interlocking cylindrical extensions on the rotor and stator base portions with the fluid transit means being provided by radially spaced, axially extending slots (e.g cuts) in these cylindrical extensions.

The rotors and stators may be of any convenient material or combination of materials but will desirably be metal or ceramic, in particular of a metal such as steel. Moreover, the rotor and stator surfaces may if desired be coated or treated to provide optimum yield or characteristics for the end product. The dimensions of the rotor and stator components will depend upon the material from which the rotor is made, the intended vesicle upper size limits, rotation speeds, rotor diameters, and mixture viscosities, but generally for stainless steel components, rotation speeds of 5000 to 10000 rpm, and aqueous mixtures, rotor diameters of up to 25 cm, e.g. 7.5 to 15 cm, may be used with cylindrical extensions of 2 to 3 mm radial depth, and slots of 5 to 6 mm axial depth and 0.3 to 2 mm circumferential width separated by at least 1.5 mm, preferably a total of 10 to 50 slots per cylindrical extension conveniently with the same number of slots on each cylindrical extension for any given rotor:stator combination. These parameters however are not limiting and mixer apparatus according to the invention may be produced with other dimensions, materials and operating speeds.

As the apparatus of the invention can generate a noticeable heating effect on gas, gas-precursor, liquid and membrane forming material mixtures and as vesicle size and stability may be affected by temperature, it is particularly desirable to provide the apparatus with temperature control means, for example thermostatcontrolled heating or cooling means such as a cooling jacket surrounding the mixing chamber or alternatively a cooling element within or in thermal connection with the the stator or the rotor, or alternatively or additionally a cooling element within or in thermal connection with the rotor drive shaft or the mechanical seal surrounding the rotor drive shaft. Such cooling elements may for example take the form of coolant coils surrounding or embedded in the component to be cooled or coolant fluid conduits disposed in or in thermal connection with such components, e.g. within a drive shaft, on the side of a stator remote from its corresponding rotor, about the periphery of a stator, etc. The temperature of the mixture may be monitored at the outlet of each mixing chamber or at the rim of the rotor and this may be used to control such temperature control means. In general, temperature can be controlled to an accuracy of ±2° C., preferably ±5° C. or better in this way and preferably the determined temperatures can be kept below 45° C., in particular below 40° C., especially following the first or single rotor and below 35° C., in particularly below 30° C. following the final rotor in a multi rotor apparatus. With the stator provided with cooling means and cooling of the rotor drive shaft and/or seal, it is possible to maintain the temperature of the mixture at 35° C. following each of the rotors.

Where the apparatus is for use in pharmaceutical production, it is desirable that it should be capable of aseptic operation and also that it be capable of sterilization without the mixing chambers being dismantled. Therefore it is particularly desirable that the drive shaft entering the mixing chamber (or the first or more preferably final mixing chamber for a multi rotor apparatus) should be provided with a double mechanical seal, for example using mechanical seals provided between static and rotating ceramic surfaces. Moreover it is desirable that each mixing chamber be provided with a drainage port to permit fluid drainage from the chamber. Such a drainage port might in some cases be provided by the chamber outlet port but will in general be in addition to the outlet port.

The gas inlet port into the first mixing chamber will preferably be sufficiently large to permit sterilization media to pass through but will generally be smaller than the liquid inlet port. The inlet port is preferably provided with a multi-directional valve allowing the inlet port to serve as the inlet port for gas and at other times for sterilization media. The "gas" inlet port may thus serve a dual function as a gas inlet for gases and gas mixtures (whether in gaseous or liquid, ie. gas precursor form) and as a liquid inlet and may have different diameters for the two functions as a result of the operation of the valve. Thus for example the liquid inlet port may be 3 to 8 mm diameter while the gas inlet port may be 0.2 to 2 mm diameter, e.g. 0.5 mm, when serving as a gas inlet and 3 to 8 mm when serving as a liquid inlet.

In a preferred embodiment, the gas and liquid inlets open into a pre-mixing chamber within the first mixing chamber with walls defined by the end of the drive shaft and a concave section of the wall of the mixing chamber, and with an annular aperture around the end of the drive shaft opening into the main portion of the mixing chamber. With a mixer means, e.g. a flange, eccentric pin, propeller or the like, attached to the end of the drive shaft, a premix of the gas and liquid occurs in this premixing chamber.

The gas introduced in the gas inlet may be any material which is gaseous at the mixing temperature, e.g. 10 to 45° C., but preferably it is a physiologically tolerable gas or gas mixture such as air, oxygen, nitrogen, helium, carbon dioxide, sulphur hexafluoride, a low molecular weight hydrocarbon or a fluorinated low molecular weight hydrocarbon, or a mixture of two or more thereof. If desired, the gas or gas mixture may be a material which is liquid on introduction into the temperatures experienced in the apparatus or experienced following administration into an animate body. (Such materials which are initially non-gaseous but serve to generate gas during mixing and/or on administration (e.g. at temperatures up to 45° C.) are generally referred to herein as gas-precursors.) In the event that the gas or gas mixture is in liquid (gas-precursor) form at the time of introduction into the rotor-stator, it is preferred that this "liquid gas" be immiscible with the liquid in which the membrane forming material is introduced through the liquid inlet port. In general however, gases and gas mixtures as discussed in WO97/29783 are especially preferred, in particular perfluorocarbons such as perfluorobutane or perfluoropentane. The materials introduced into the rotor-stator mixer may optionally contain more than one gaseous or gas forming component, e.g. one which is in liquid form at mixing and ambient temperatures but which is gas forming at physiological temperatures and one which is in gaseous form at mixing and ambient temperatures. In this way a vesicular composition may be produced which, following administration into an animate body, results in vesicle size increase, e.g. as described in WO98/17324 the contents of which are incorporated herein by reference. The liquid gas-forming component may conveniently be an emulsifiable low boiling liquid such as described in WO94/16379 and listed in WO98/17324, for example perfluoropentane.

The membrane forming material introduced in the liquid inlet is preferably an amphiphilic material, for example an ionic or non-ionic surfactant or more preferably a lipid, for example a phospholipid. Since one particular use for gas-containing vesicles is as injectable contrast agents, the membrane forming material is preferably physiologically tolerable. Phospholipids, in particular charged phospholipids and mixtures thereof, especially as disclosed in WO97/29783, are particularly preferred.

The liquid in which the membrane forming material is introduced may be any liquid in which gas containing vesicles may be formed. Preferably it is a sterile aqueous liquid, e.g. as described in WO97/29783.

The absolute and relative flow rates of the gas, liquid and membrane forming materials into the mixing apparatus used according to the invention will depend upon the particular materials and apparatus used as will the operational parameters for the mixing apparatus. Generally however the apparatus will be operated to produce vesicles having a mean particle size, by volume, in the range 1 to 10 µm, especially 2 to 7 µm, particularly 2.5 to 5 µm.

Apparatus according to the invention may also be used for the manufacture of emulsions, in which case a separate gas inlet port is not required. Such apparatus forms a further aspect of the invention. The emulsion generating apparatus of the invention however preferably comprises at least one of the following: double mechanical seal on the drive shaft; temperature control means; and a plurality of stators.

The disclosures of the documents referred to herein are all incorporated herein by reference.

BRIEF DESCRIPTION OF THE DRAWINGS

The invention will now be described further with reference to the accompanying drawings in which:

Referring to FIG. 1 there is shown a stator 1 having the form of an open ended cylinder with apertures 2 in the sides thereof. Rotor 3 is disposed inside stator 1 and has an open ended cylindrical tip with axially extending grooves 4. In use fluid passes from within rotor 3, through grooves 4 and out through apertures 2.

Referring to FIG. 2, in the apparatus of the invention gas and liquid are introduced through inlets 5 and 6 respectively into premixing chamber 7, the walls of which are defined by a concave section of housing 8, first stator element 9, and the tip 10 of rotor drive shaft 11.

Figure 2:
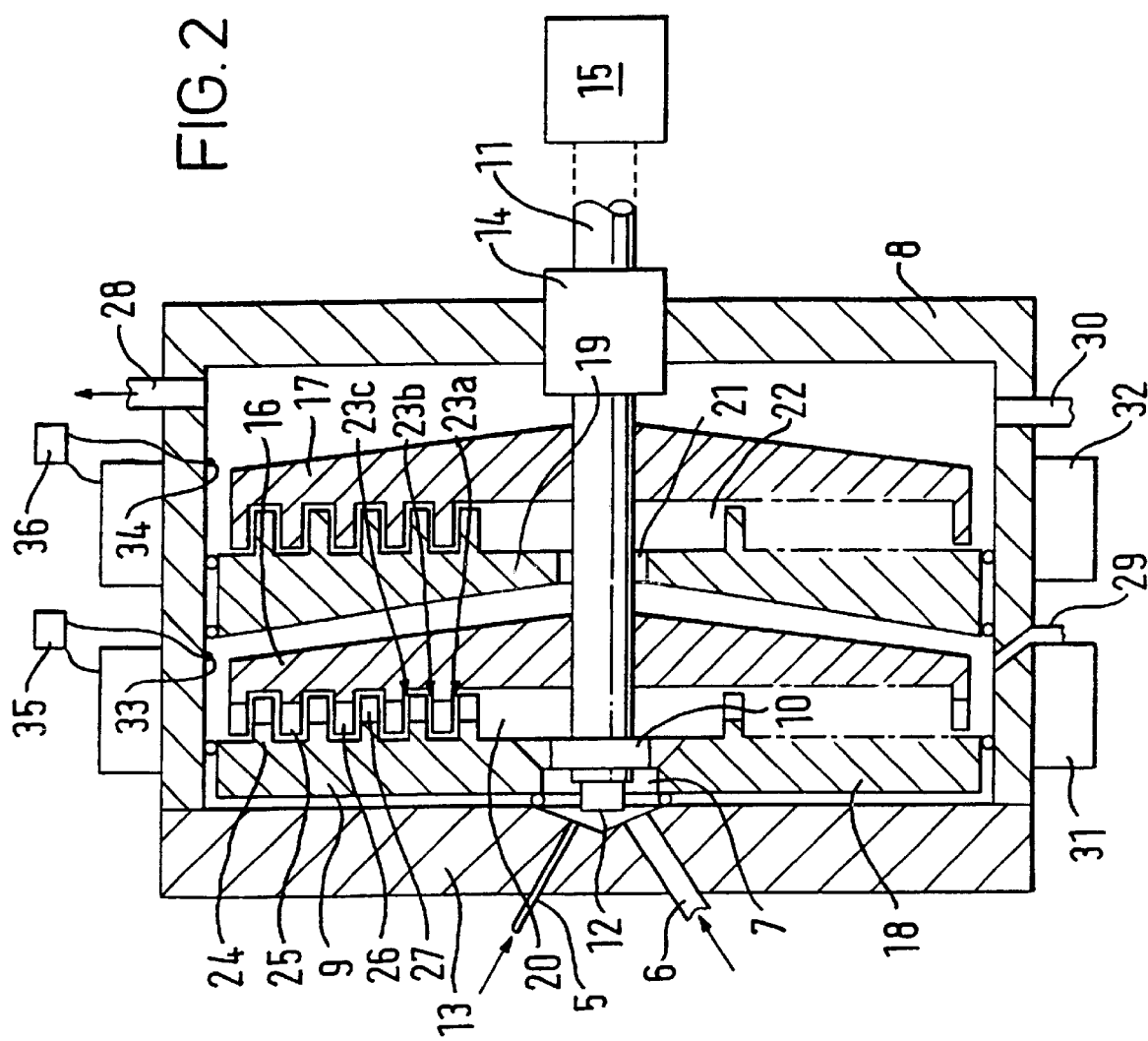
FIG. 2 is a schematic axial-sectional diagram of a rotor-stator mixer apparatus according to the invention.
Figure 1:
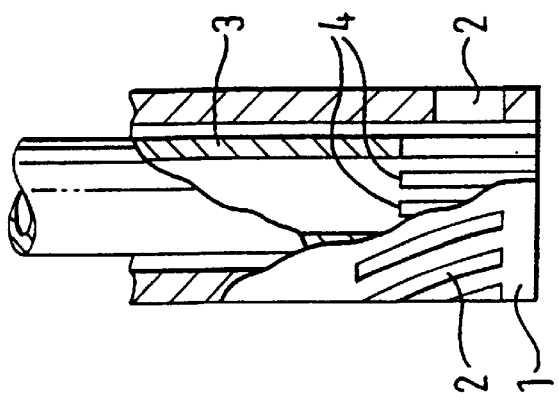
FIG. 1 is a partial cutaway schematic diagram of a conventional rotor-stator mixer.

Tip 10 of rotor drive shaft 11 carries a flange 12 (seen side-on) which serves to mix gas and liquid in pre-mix chamber 7.

Housing 8 provides a cylindrical chamber and has a cup-shaped portion 8 and an end cap 13 with rotor drive shaft 11 entering through the base of portion 8 and sealed by a double mechanical seal 14. Drive shaft 11 is rotated by externally positioned motor 15 and rotates first rotor 16 and second rotor 17 which are in interlocking engagement with first stator 18 and second stator 19. The rotors and stators are gold plated and have an external diameter of about 110 mm.

Premix chamber 7 communicates with first mixing chamber 20 which is defined by surfaces of housing 8, first stator 18, and second stator 19 and which has an outlet 21 which corresponds to the inlet to second mixing chamber 22. Second mixing chamber 22 is defined by surfaces of second stator 19 and housing 8.

In first mixing chamber 20, material from premixing chamber 7 passes radially outward through shear force zones 23a,b,c etc. between cylindrical extensions 24,25 of first stator 18 and first rotor 16 through fluid passageways defined by axial slots 26,27 in first rotor and first stator. Conveniently each rotor-stator assembly defines about 12 to 14 such shear force zones. At the periphery of the mixing chamber, the material being mixed then passes radially inward to pass from first mixing chamber to second mixing chamber through outlet 21.

The cylindrical extensions of rotor and stator are not shown in the lower portion of FIG. 2 and the slots in cylindrical extensions of second rotor and second stator are likewise not shown.

In second mixing chamber 22, the mixture passes radially outward between second rotor and second stator before leaving through outlet 28.

First and second mixing chambers 20 and 22 are provided with drainage ports 29 and 30 along their lower boundary. These drainage ports may be connected to a steam trap and drain, e.g. as is conventional in pharmaceutical manufacturing apparatus. Moreover about their periphery, first and second mixing chambers are provided with annular temperature control means, e.g. water cooling jackets, 31 and 32, temperature controlled by monitors 33,34 and control means 35,36.

In a typical example of the use of the mixer apparatus, drive shaft 11 is rotated at 8000 rpm or such a rate as to cause outer shear force zone 23 to have a relative rotor:stator speed of at least 32 m/s, e.g. 46 m/s. Gas, e.g. perfluorobutane, is introduced through inlet 5 at a flow rate of 50 to 200 mL/min. An aqueous liquid comprising hydrogenated egg phosphatidylserine (5 mg/mL) and 5.4% w/w of propylene glycol and glycerol (3:10 w/w) is introduced through inlet 6 at a rate of 50 to 200 mL/min., preferably at a volume ratio relative to the gas of 0.5 to 2:1. Gas and liquid are introduced at 20±5 C., first water jacket 31 is controlled to maintain the temperature of the mixture at monitor 33 at 38° C., second water jacket 32 is controlled to maintain the temperature of the mixture at monitor 34 at 28° C. and the median vesicle size by volume in the mixture leaving outlet 28 is about 3±1.5 μm.

Figure 3:
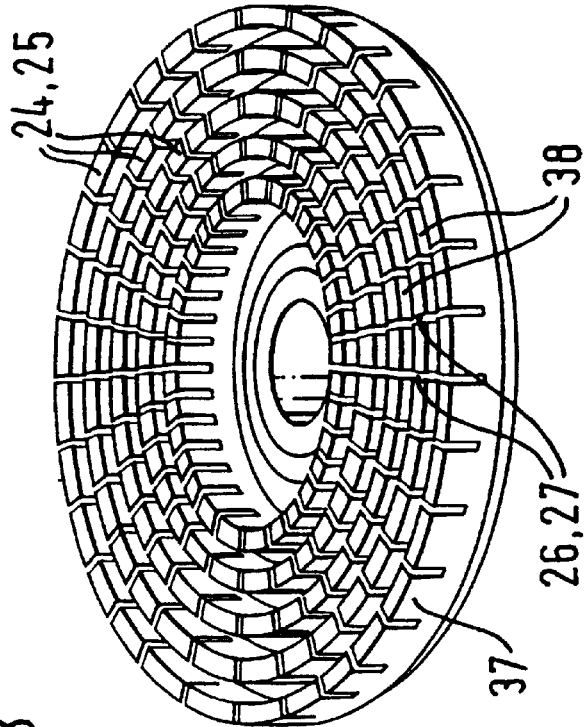
FIG. 3 is a diagram of a rotor-stator assembly for a mixer apparatus according to the invention.

Referring to FIG. 3, there is shown a rotor-stator array for a rotor-stator mixing apparatus. It may be seen that the cylindrical extensions (flanges) 24,25 and axial slots 26,27 of the stators and rotors are axially extending and comprise a plurality of axially extending "teeth" 37 separated by a corresponding plurality of circumferentially evenly spaced, axially and radially extending apertures 38. In use, the materials being mixed pass through these apertures into successive shear force application zones defined by the circumferential sides of adjacent cylindrical extensions and axial slots.

Figure 4:
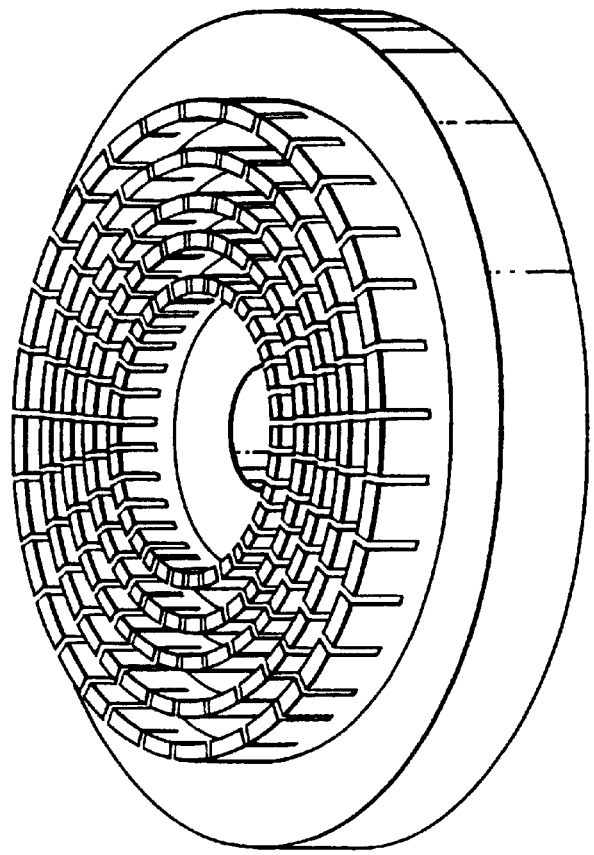
Figure 4:
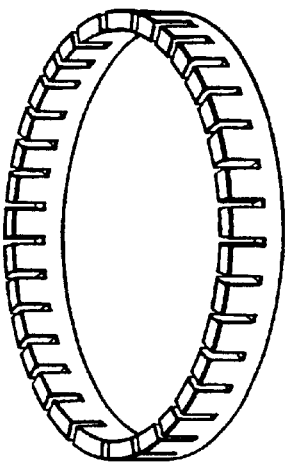

Referring to FIG. 4, there is shown a representation of an individual flange 24,25.

What is claimed is:

1. A process for the preparation of gas-containing vesicles wherein a mixture of gas or gas-precursor, liquid and vesicle membrane forming material is passed through a zone in which it is subject to sheer forces exerted by surfaces moving relative to each other a speed of at least 20 m/s wherein said vesicle membrane forming material is a lipid.

2. A process as claimed in claim 1 wherein said surfaces move relative to each other at a speed of at least 30 m/s.

3. A process as claimed in claim 1 wherein said surfaces move relative to each other at a speed of up to 60 m/s.

4. A process as claimed in claim 1 wherein said mixture is passed sequentially through a plurality of different zones in which it is subject to shear forces exerted by surfaces moving relative to each other.

5. A process as claimed in claim 4 wherein said mixture is passed sequentially through a plurality of different zones in which it is subject to shear forces exerted by at least one rotor movoing relative to at least one stator.

6. A process as claimed in claim 5 wherein said mixture is passed sequentially through a plurality of different zones in which it is subject to shear forces exerted by at least two rotors each moving relative to a corresponding stator.

7. A process as claimed in claim 4 wherein said mixture is passed sequentially through at least 18 said zones.

8. A process as claimed in claim 4 wherein said mixture is passed sequentially through up to 90 said zones.

9. A process as claimed in claim 1 wherein said moving surfaces are separated by from 100 to 500 μm.

* * * * *